United States Patent [19]

Ivanov et al.

[11] Patent Number: 5,513,380
[45] Date of Patent: Apr. 30, 1996

[54] MOBILE SPEED DEPENDENT HANDOVER TECHNIQUES IN HIERARCHICAL MOBILE RADIO NETWORKS

[75] Inventors: Kolio Ivanov; Egon Schulz, both of Munich, Germany

[73] Assignee: Siemens Aktiengesellschaft, Munich, Germany

[21] Appl. No.: 195,390

[22] Filed: Feb. 14, 1994

[51] Int. Cl.$^6$ .................................................. H04Q 7/22
[52] U.S. Cl. ................ 455/33.2; 455/54.1; 455/56.1; 379/60
[58] Field of Search ................... 455/33.1, 33.2, 455/33.4, 54.1, 54.2, 56.1; 379/59, 60

[56] References Cited

U.S. PATENT DOCUMENTS

| | | | |
|---|---|---|---|
| 5,146,609 | 9/1992 | Taylor et al. | 455/33.2 |
| 5,189,734 | 2/1993 | Bailey et al. | 455/56.1 |
| 5,260,943 | 11/1993 | Comroe et al. | 379/60 |
| 5,262,263 | 11/1993 | Ramsdale et al. | 455/56.1 |
| 5,278,991 | 1/1994 | Ramsdale et al. | 455/33.2 |
| 5,345,499 | 9/1994 | Benveniste | 379/59 |

FOREIGN PATENT DOCUMENTS

| | | |
|---|---|---|
| 2240696 | 8/1991 | United Kingdom . |
| WO92/12602 | 7/1992 | WIPO . |

*Primary Examiner*—Edward F. Urban
*Attorney, Agent, or Firm*—Hill, Steadman & Simpson

[57] ABSTRACT

In A speed-dependent hand over procedure for hierarchic cell structures, a check is carried out given a mobile station traveling into A radio coverage domain of a micro cell to see whether the radio coverage of the mobile station with respect to the micro cell has significantly or insignificantly improved within a time interval. In case of a significant improvement, the micro cell is blocked for the rapidly traveling mobile station.

23 Claims, 8 Drawing Sheets

(PRIOR ART)

MOBILE SPEED DEPENDENT HANDOVER TECHNIQUES IN HIERARCHICAL MOBILE RADIO NETWORKS

BACKGROUND OF THE INVENTION

The present invention is directed to a mobile radio network having a plurality of base stations in a spatial arrangement in the fashion of a cellular system in a hierarchic cell structure, composed of a macro cell and of at least one micro cell.

Figure 1:
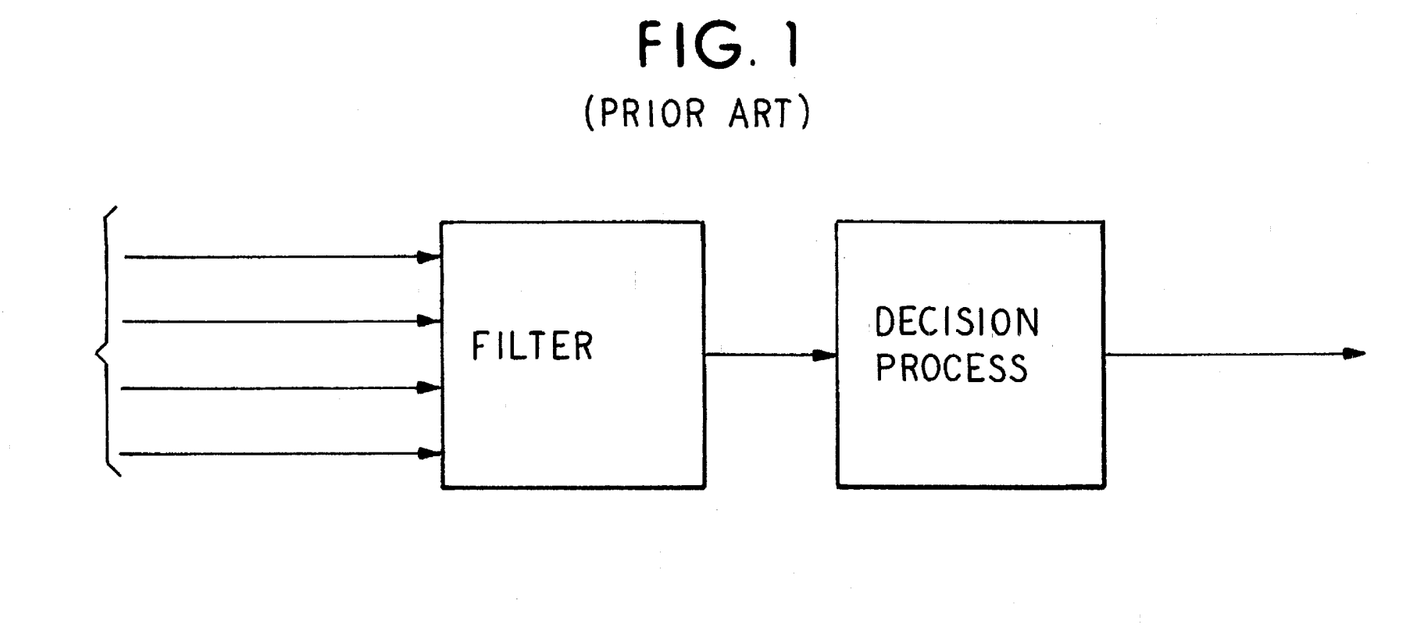
FIGS. 1, 2 and 3 depict prior art mobile radio networks having micro cells.

The hand over from the radio management domain of one cell into that of a neighboring cell can be initiated for various reasons. For example, hand over reasons can be that the received level has fallen below a certain threshold, the quality (bit error rate—BER) is too poor, the distance to the administering base station has become too great, because of excessively high interference, because of the power budget of a better cell or for traffic reasons as well. These are thereby a matter of what are referred to as static hand over decisions, i.e. the data measured by the mobile station and/or base station, namely level, quality, distance, etc., or the quantities derived from the measured data are compared, upon utilization of a filter, for example by averaging the measured data, to chronologically constant thresholds that can be administered by O & M (operation and maintenance). This procedure is shown in a block circuit diagram of FIG. 1. The measured data arriving from a mobile station and/or base station are supplied to a filter which is followed by a means for the hand over decision process which outputs a hand over request given the presence of appropriate criteria.

Figure 2:
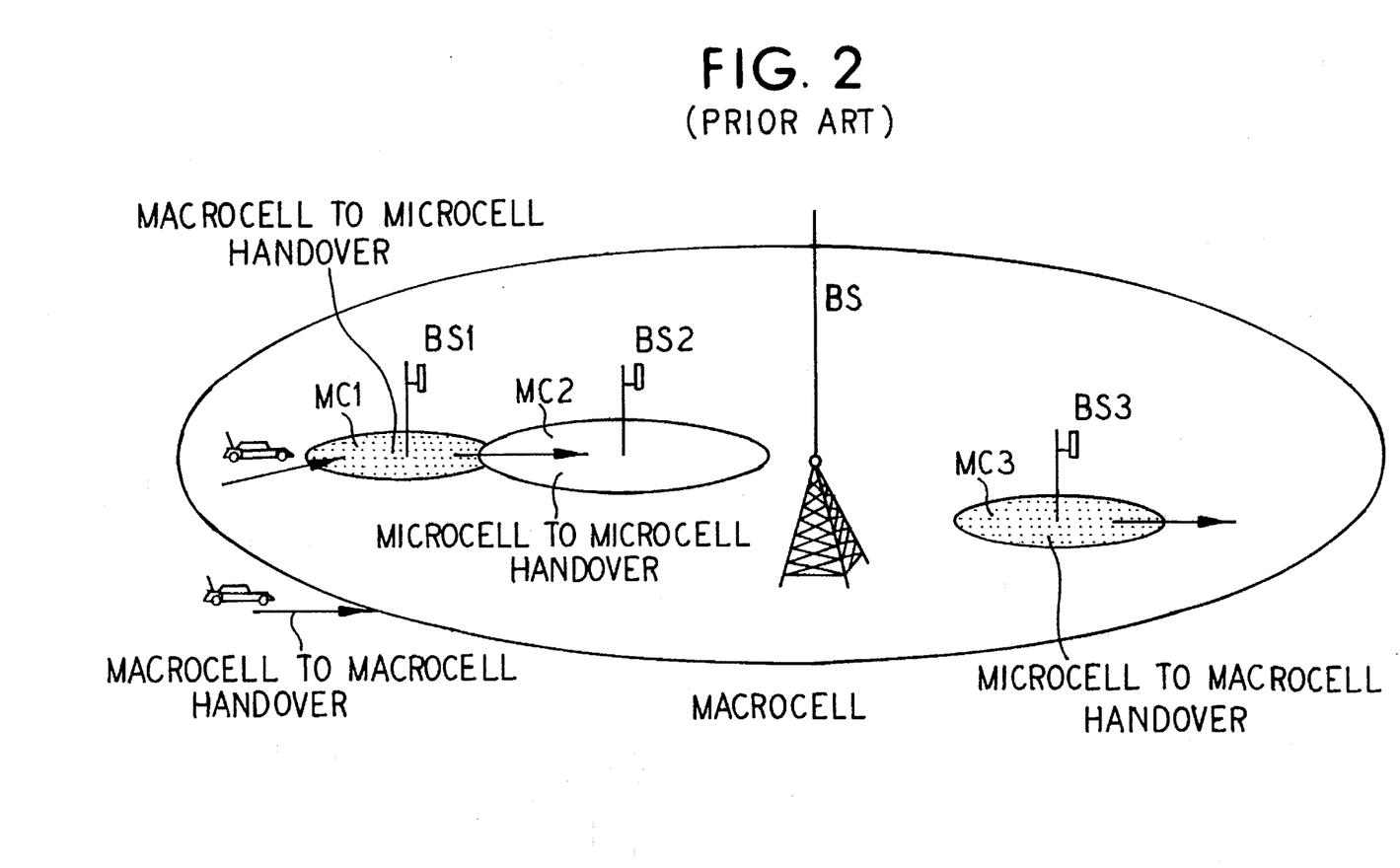

In order to have both channel capacities in regions having high subscriber densities as well as an adequate supply available between regions of high subscriber density, a switch shall be made to mixed or hierarchic cell structures composed of small cells (micro cells) which are in turn integrated in a large cell (macro cell, also referred to as umbrella cell). FIG. 2 shows such a structure. A plurality of micro cells MC1, MC2, MC3 having the base stations BS1, BS2, BS3 are thereby arranged within a macro cell having the base station BS. There are four types of hand over for a mobile station that moves in such a mixed cell system, namely from the macro cell to another macro cell, from the macro cell to a micro cell, from one micro cell to another micro cell as well as from the micro cell to a macro cell. The radius of the micro cells will thereby be extremely small and usually amount to only a few hundred meters. Slowly moving mobile radio telephone users are to be supplied by the micro cells; the macro cells (umbrella cells), by contrast, are intended to assure the radio management of rapidly moving mobile stations.

Figure 3:
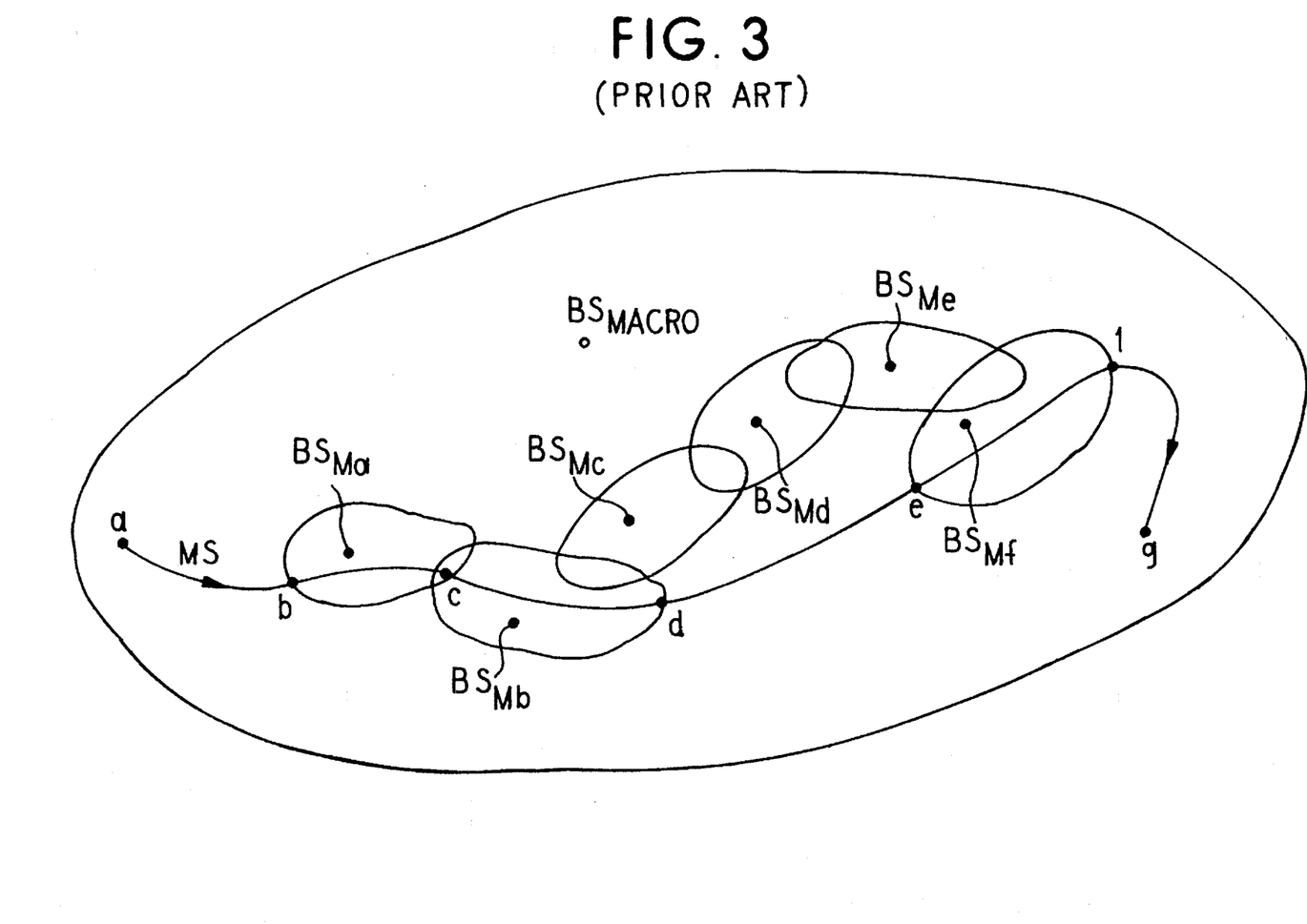

By joining micro cells which are integrated in the macro cell to one another, there is the possibility that a rapidly moving mobile station that is allocated to the base station of the macro cell and travels into the radio management or coverage domain of a micro cell located in the macro cell is allocated to the base station of the micro cell on the basis of static hand over decisions. Since the mobile station moves very rapidly and the micro cell has a small diameter, the mobile station will in turn rapidly leave the micro cell and a new hand over is pending. Either a hand over for the mobile station into the original macro cell or in hand over into the adjoining micro cell will thereby be requested when a further micro cell adjoins the micro cell that has been traversed. FIG. 3 shows such a scenario of a mobile station in a hierarchic cell structure that can be arbitrarily continued.

A series of micro cells having the base station $BS_{Ma}$, $BS_{Mb}$, $BS_{Mc}$, $BS_{Md}$, $BS_{Me}$ and $BS_{Mf}$ are thereby integrated within a macro cell having the base station $BS_{Macro}$. A mobile station MS moves along a travel path from point a to point g via the points b, c, d, e and f that lie in the edge region of a few micro cells. The mobile station is thereby first allocated to the macro cell having the base station $BS_{Macro}$ and sets up a call. It then travels into the radio coverage domain of the micro cell having the base station $BS_{Ma}$. The hand over decision process requests a hand over for the mobile station into the micro cell having the base station $BS_{Ma}$. The mobile station MS then travels into the radio coverage domain of the micro cell having the base station $BS_{Mb}$. The hand over decision process requests a hand over for the mobile station into the micro cell having the base station $BS_{Mb}$. After this, the mobile station leaves the radio coverage domain of the micro cell having the base station $BS_{Mb}$. The hand over decision process now requests a hand over for the mobile station into the macro cell having the base station $BS_{Macro}$. The further micro cells lie outside the travel path of the mobile station, so that the hand over decision process only requests a hand over for the mobile station into the micro cell having the base station $BS_{Mf}$ when the mobile station travels into the radio coverage domain of the micro cell having the base station $BS_{Mf}$. When the radio coverage domain of the micro cell having the base station $BS_{Mf}$ is left, the hand over decision process requests a hand over for the mobile station into the macro cell having the base station $BS_{Macro}$. The mobile station ends the call and remains allocated to the macro cell having the base station $BS_{Macro}$. All this requires a high signaling outlay. It can also be stated that the continuous hand over from one micro cell to another can lead to a loss of the call given a slow execution of the hand over decisions, for example given a great averaging length of the measured data.

The speed of the mobile radio telephone subscriber is not taken into consideration in prior methods for deciding a hand over for a mobile station. The hand over methods are based on static hand over decisions, that is, the data measured by the mobile station and/or base station or quantities derived from measured data are supplied to the hand over decision process upon utilization of a filter. In this decision process, the filtered data are compared to permanently set thresholds or are compared to chronologically constant thresholds that can be administered by O & M. When the filtered data downwardly or upwardly transgress the appropriate thresholds, then a hand over is requested for the appertaining mobile station.

SUMMARY OF THE INVENTION

It is an object of the present invention to reduce the plurality of hand overs for rapidly moving mobile stations in such a mixed cell structure.

In a mobile radio network of the type initially cited, this object is inventively achieved by a hand over from the radio coverage domain of a macro cell into that of one or more further micro cells that takes the speed of a mobile radio telephone subscriber into consideration and is implemented in addition to the static hand over decisions such that a finding is made in the hand over decision process for a mobile station allocated to the base station of the macro cell, by comparison the measured data about level, quality, distance and the like calculated by the mobile station and/or by the base station and/or of the quantities derived from the measured data to thresholds, as to whether the mobile station is located in the radio coverage domain of the micro cell contained in the macro cell or approaches this, and, given a positive result, a means for time acquisition (timer) having an arbitrary but fixed time interval is started, during which a determination is continuously made on the basis of the measured data arriving in the hand over decision process as to whether the radio coverage for the appertaining mobile station by the base station of the micro cell has significantly or insignificantly improved, and such that the micro cell is blocked for an incoming hand over for the appertaining mobile station when the radio coverage with respect to the micro cell has significantly improved within a time interval as an indicator of rapid motion of the mobile station and a hand over into the micro cell is requested by the hand over decision process for that case wherein the radio coverage has insignificantly improved after the run-down of the timer as an indicator of slow movement of the mobile station.

In this speed-dependent hand over method for hierarchic cell structures, a check is carried out given a mobile stations traveling into the radio coverage domain of a micro cell to determine if the radio coverage of the mobile station significantly or insignificantly improves with respect to the micro cell within a time interval.

When the radio coverage significantly improves within a time interval, that is, during the run-down of a timer, then one can conclude therefrom that the mobile station is rapidly moving toward the base station of the micro cell. With this criterion, the micro cell is indirectly blocked by the hand over decision process for the rapidly moving mobile station. The blocking of the micro cell is only canceled when the mobile station leaves the radio coverage domain of the micro cell. When, by contrast, the radio coverage improves insignificantly after a time interval, that is, after the run-down of a timer, then one can conclude therefrom that the mobile station is moving slowly toward the base station of the micro cell. A hand over into the micro cell is requested by the hand over decision process with this criterion.

Further developments of the present invention are as follows.

The block for incoming hand over into the micro cell is canceled for the appertaining mobile station and the timer is reset when the hand over decision process has found that the mobile station has left the radio coverage domain of the micro cell.

The timer is started again when it is recognized in the hand over decision process that the mobile station is again located in the radio coverage domain of a micro cell.

A corresponding execution of the hand over procedure for that case wherein the mobile station is allocated to the base station of a micro cell of a hierarchic cell structure and approaches an adjoining micro cell.

The timer is stopped and reset after a successful hand over.

A hand over into the adjoining micro cell is requested for the mobile station given slow travel of the mobile station toward the adjoining micro cell and a hand over into the macro cell lying thereabove is requested given fast travel.

The time interval to be monitored is greater than or equal to a measurement period for the evaluation of the reception data being received in the hand over decision process.

A monitoring timer is provided between the resetting of the timer and the re-starting of the timer for one and the same call, this monitoring timer being started when the timer is reset and effecting that the timer can only be started again after the run-down of the monitoring timer in case the mobile station is located in the radio coverage domain of a micro cell.

The timer and/or monitoring timer are implemented as counters.

The timer and/or monitoring timer is administered per call and per neighboring cell.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements, and in which:

Partial illustrations in FIGS. 4–7 thereby show various versions for a mobile station moving with different speed within a macro cell and micro cells integrated therein, hand over procedures being explained with reference to the appertaining versions.

DESCRIPTION OF THE PREFERRED EMBODIMENT

It is important to the present invention given the method disclosed here for decision finding of a hand over of a mobile station in a hierarchic cell structure composed of a macro cell and at least one or more micro cells that the speed of the appertaining mobile station is taken into consideration in addition to the static hand over decisions. The integration of the speed of the mobile stations or, respectively, of the mobile telephone subscribers can be realized in all mobile radio systems wherein measured data such as, for example, received level, quality, distance, etc., from the mobile station and/or base station and/or quantities derived from these measured data are supplied to the hand over decision process in arbitrary but fixed time intervals. In the GSM system, measured data and/or quantities derived from the measured data are generally communicated to the hand over decision process in $T_{SAACH}$ intervals or a multiple thereof. A $T_{SAACH}$ interval amounts to approximately 480 msec.

It is provided as initial situation that a mobile station is located in a hierarchically arranged cell structure composed of a macro cell and at least one or more micro cells, and that the mobile station is allocated to the base station of the macro cell. By comparing the measured data calculated by the mobile station and/or the base station and/or quantities derived from the measured data to thresholds, a finding is made in the hand over decision process as to whether the mobile station is located in the radio coverage domain of the micro cell contained in the macro cell or whether it is approaching the radio coverage domain of the micro cell contained in the macro cell. When this is the case, then a timer having the starting value $T_0$ is started in the hand over decision process. The timer or, respectively, the time interval to be monitored is thereby selected such that it is greater than or equal to a measuring period of the measured data arriving in the hand over decision process. Consequently, the time interval to be monitored should be a multiple of $T_{SAACH}$ for the GSM system.

During the running of the timer $T_{HO}$ or, respectively, during the arbitrary but fixed time interval, a decision as to whether the mobile station is still located in the radio coverage domain of the micro cell is made on the basis of the measured data from the mobile station and/or base station arriving in the hand over decision process and/or on the basis of the quantities derived from the measured data. Further, a check is carried out in the hand over decision process to see whether the radio coverage for the appertaining mobile station by the base station of the micro cell has significantly or insignificantly improved.

Figure 4:
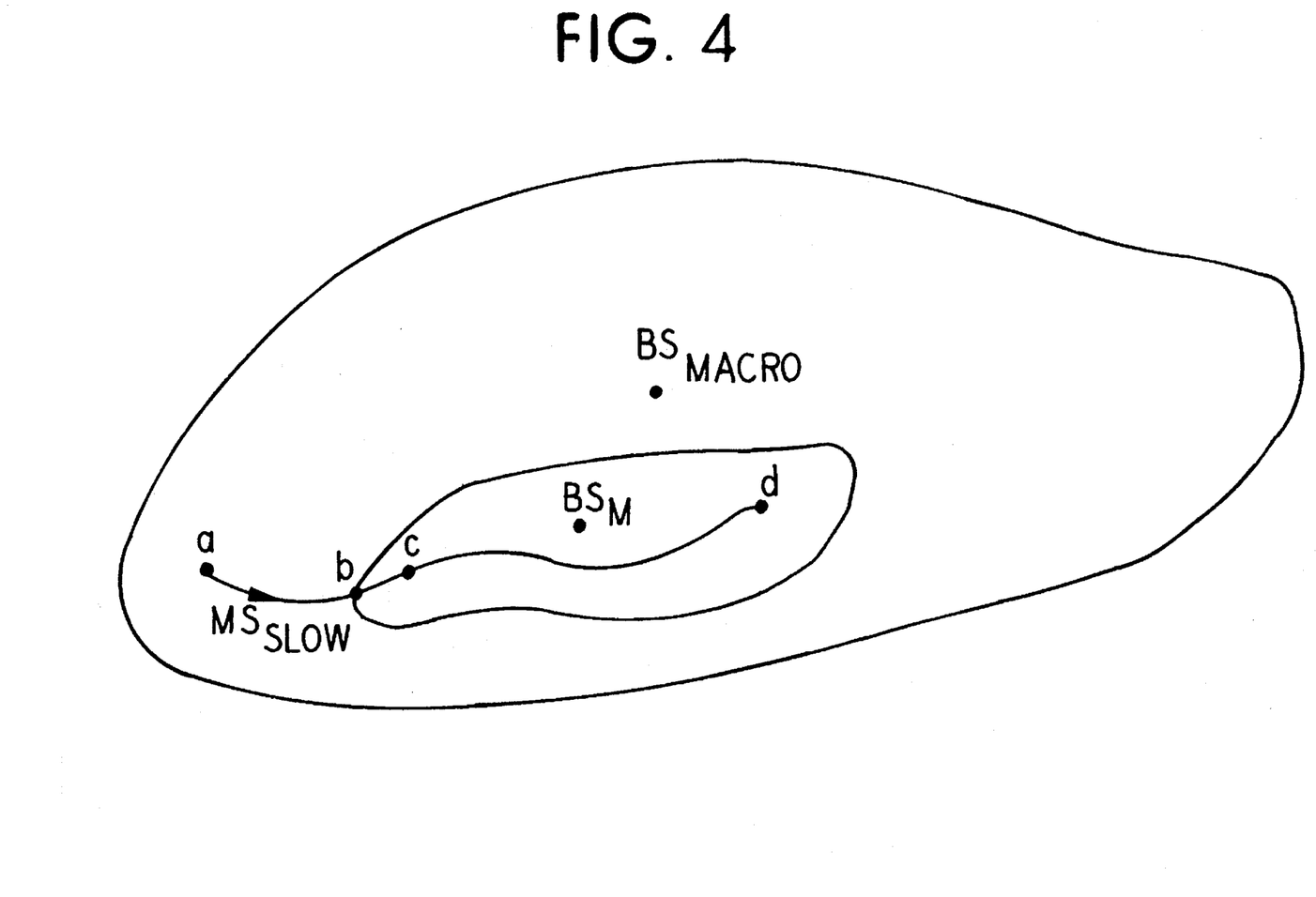

When it is found in the hand over decision process that the mobile station is still located in the radio coverage domain of the micro cell after expiration of the timer or, respectively, after the time interval and the radio coverage has insignificantly improved, then a hand over for the appertaining mobile station into the micro cell is requested. This applies to the version of FIG. 4 that shows the hand over procedure for a slow mobile station, for which the timer runs down shortly before the radio coverage domain of the micro cell is reached and the hand over decision process finds that the radio coverage of the mobile station has not significantly improved with respect to the micro cell and the hand over decision process therefore requests a hand over into the micro cell for the mobile station.

In the exemplary embodiment of FIG. 3, a slow mobile station MS starting from point a is allocated to the macro cell having the base station $BS_{Macro}$ and sets up a call. At point b, the mobile station MS reaches a micro cell having the base station $BS_M$ that is integrated in the macro cell. The mobile station MS is located in the radio coverage domain of the micro cell and the hand over decision process starts the timer $T_{HO}$. It is assumed that the timer $T_{HO}$ has rundown when the mobile station MS has reached the point c not far from b. Since the mobile station MS is still located in the radio coverage domain of the micro cell having the base station $BS_M$ and the radio coverage of the mobile station MS by the base station $BS_M$ of the micro cell has insignificantly improved, a hand over into the micro cell is requested. When point d is reached, this likewise being located within the micro cell, the mobile station MS ends the call in the micro cell and proceeds into idle mode.

When, by contrast, it is found before the expiration of the timer or, respectively, within the time interval in the hand over decision process that the mobile station is still located in the radio coverage domain of the micro cell and the radio coverage has significantly improved with respect to the micro cell, then this indicates that the mobile station is moving rapidly toward the base station of the micro cell, and the micro cell is blocked for incoming hand over for the appertaining mobile station by the hand over decision process. The hand over decision process cancels the block for incoming hand over into the micro cell for the appertaining mobile station when the hand over decision process has found that the mobile station has left the radio coverage domain of the micro cell. The timer is also reset with the cancellation of the block.

Figure 5:
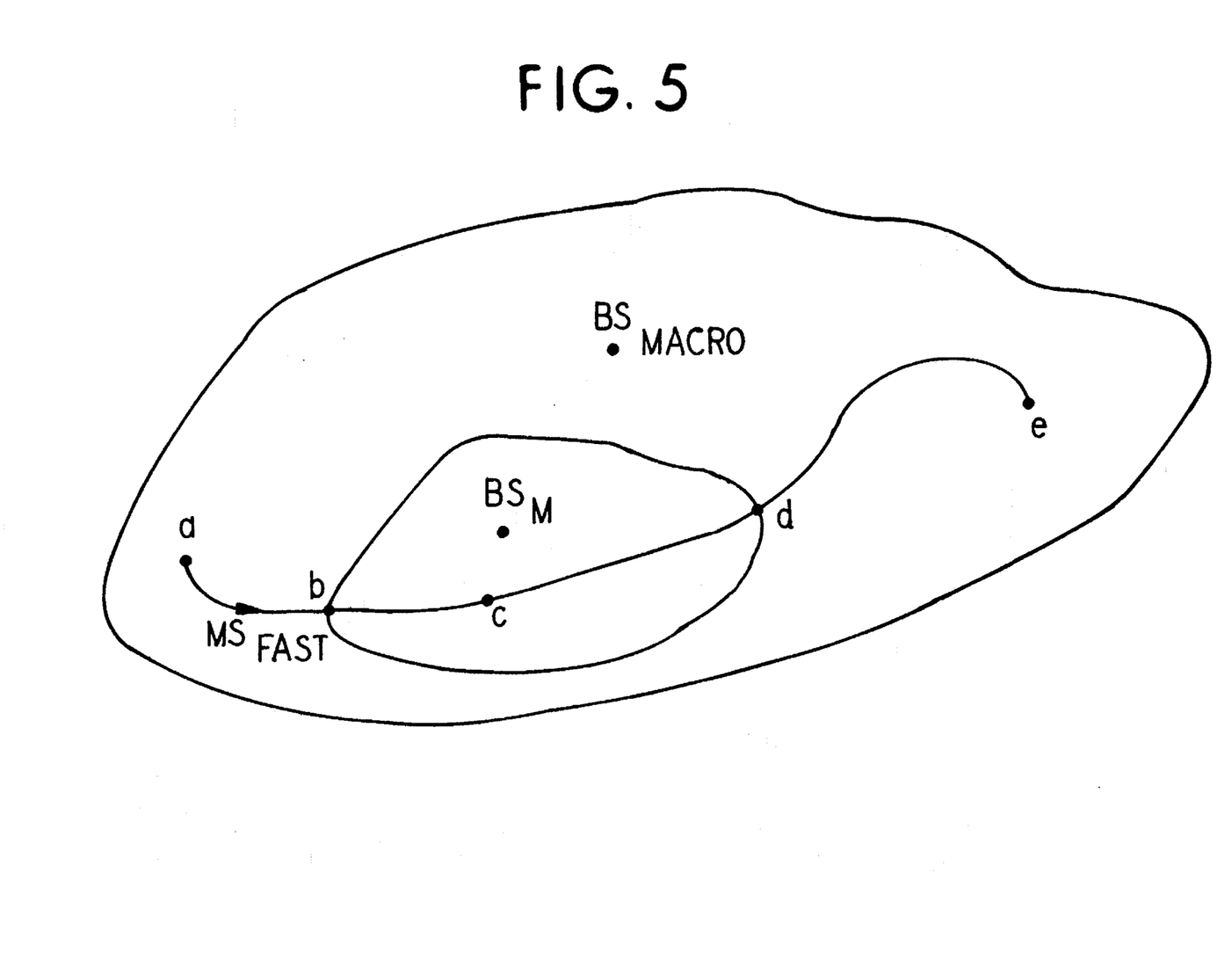

This case is shown in FIG. 5, wherein a fast mobile station MS is allocated to the macro cell having the base station $BS_{Macro}$ and sets up a call. The mobile station travels into the radio coverage domain of the micro cell having the base station $BS_M$ in point b and the hand over decision process starts the timer $T_{HO}$. While the timer $T_{HO}$ is running, the hand over decision process finds that the mobile station MS is still located in the radio coverage domain of the micro cell having the base station $BS_M$ and the radio coverage of the mobile station by the base station $BS_M$ of the micro cell has significantly improved (point c). The micro cell having the base station $BS_M$ is blocked by the hand over decision process for incoming hand over for the appertaining mobile station and a hand over into the micro cell is therefore not requested. The mobile station thus remains allocated to the macro cell having the base station $BS_{Macro}$. The fast mobile station MS leaves the radio coverage domain of the micro cell having the base station $BS_M$ in point d; the block is canceled and the timer $T_{HO}$ is reset. The fast mobile station MS remains allocated to the macro cell having the base station $BS_{Macro}$ and ends the call.

Figure 6:
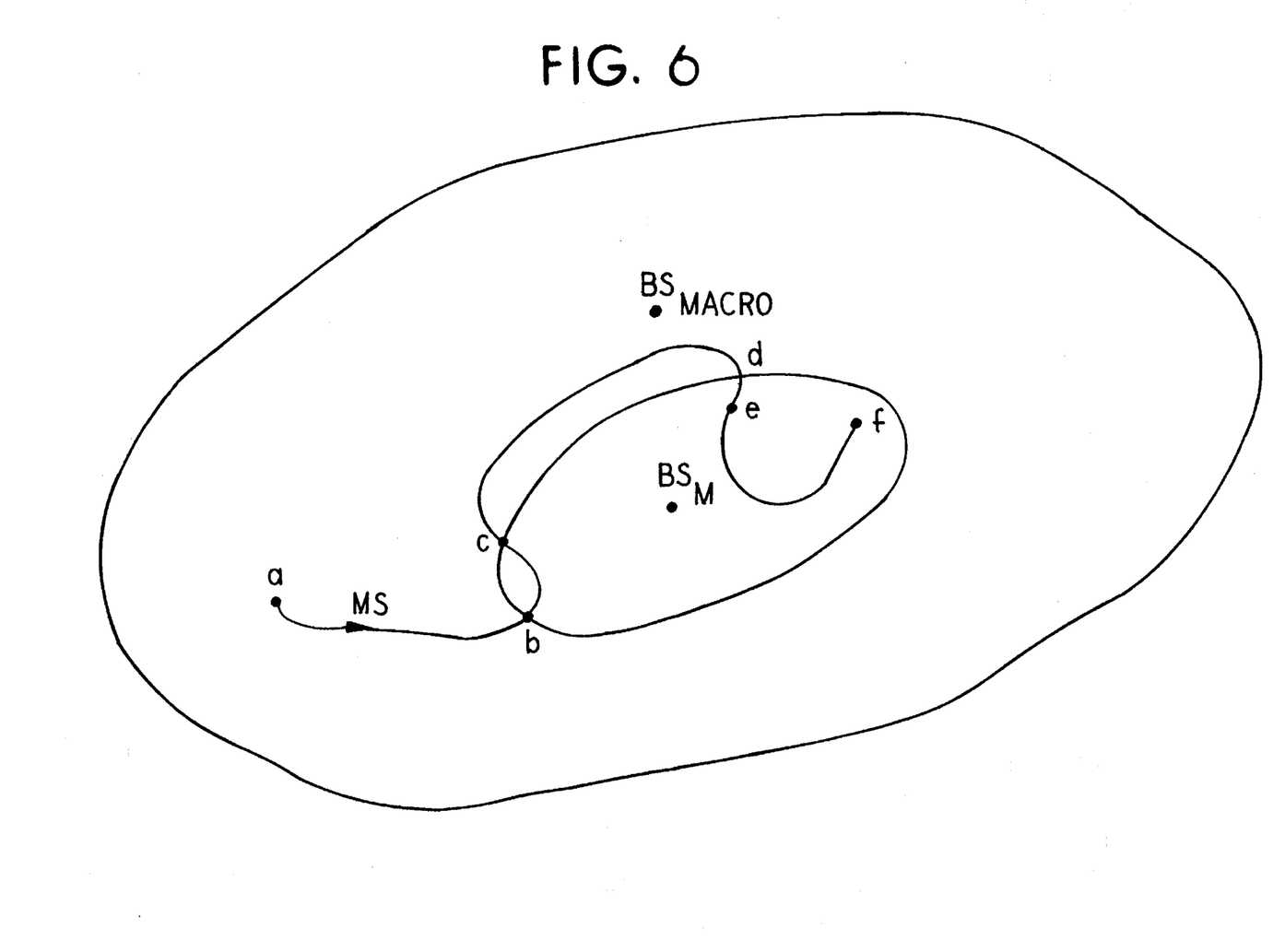

When, before the run-down of the timer or, respectively, within the time interval, it is found on the basis of the measured data from the mobile station and/or base station arriving in the hand over decision process and/or on the basis of the quantities derived from the measured data that the mobile station is no longer located in the radio coverage domain of the micro cell, then the timer is reset. The timer is started again when it is found in the hand over decision process that the mobile station is again located in the radio coverage domain of a micro cell. This case is shown in the exemplary embodiment of FIG. 6. For example, this can be a matter of the scenario in a large city, whereby corresponding circuities routes must be travelled in order to arrive at the destination, whereby the central city is additionally covered by a micro cell. As stated in the exemplary embodiments set forth above, a mobile station MS initially located outside the micro cell is allocated to the macro cell having the base station $BS_{Macro}$ and sets up a call therein. The mobile station travels into the radio coverage domain of the micro cell having the base station $BS_M$ at point b and the hand over decision process starts the timer $T_{HO}$. The mobile station MS leaves the radio coverage domain of the micro cell again at point c before the timer $T_{HO}$ has run down. The hand over decision process has not found any significant improvement of the radio coverage of the mobile station by the base station $BS_M$ of the micro cell over the distance b–c. The timer $T_{HO}$ is stopped, reset and no re-started, since the mobile station MS is no longer located in the radio coverage domain of the micro cell having the base station $BS_M$. The mobile station MS remains allocated to the macro cell having the base station $BS_{Macro}$. At point d, the mobile station MS again reaches the radio coverage domain of the micro cell and the hand over decision process thereupon starts the timer $T_{HO}$. The mobile station is still located in the radio coverage domain of the micro cell having the base station $BS_M$ in point e. The timer $T_{HO}$ has run down and the hand over decision process finds that the radio coverage of the mobile station by the base station $BS_M$ of the micro cell has insignificantly improved. Consequently, the hand over decision process requests the hand over into the micro cell for the mobile station MS. At point f, which is likewise still located within the micro cell, the mobile station MS ends the call and remains allocated to the micro cell having the base station $BS_M$.

Figure 7:
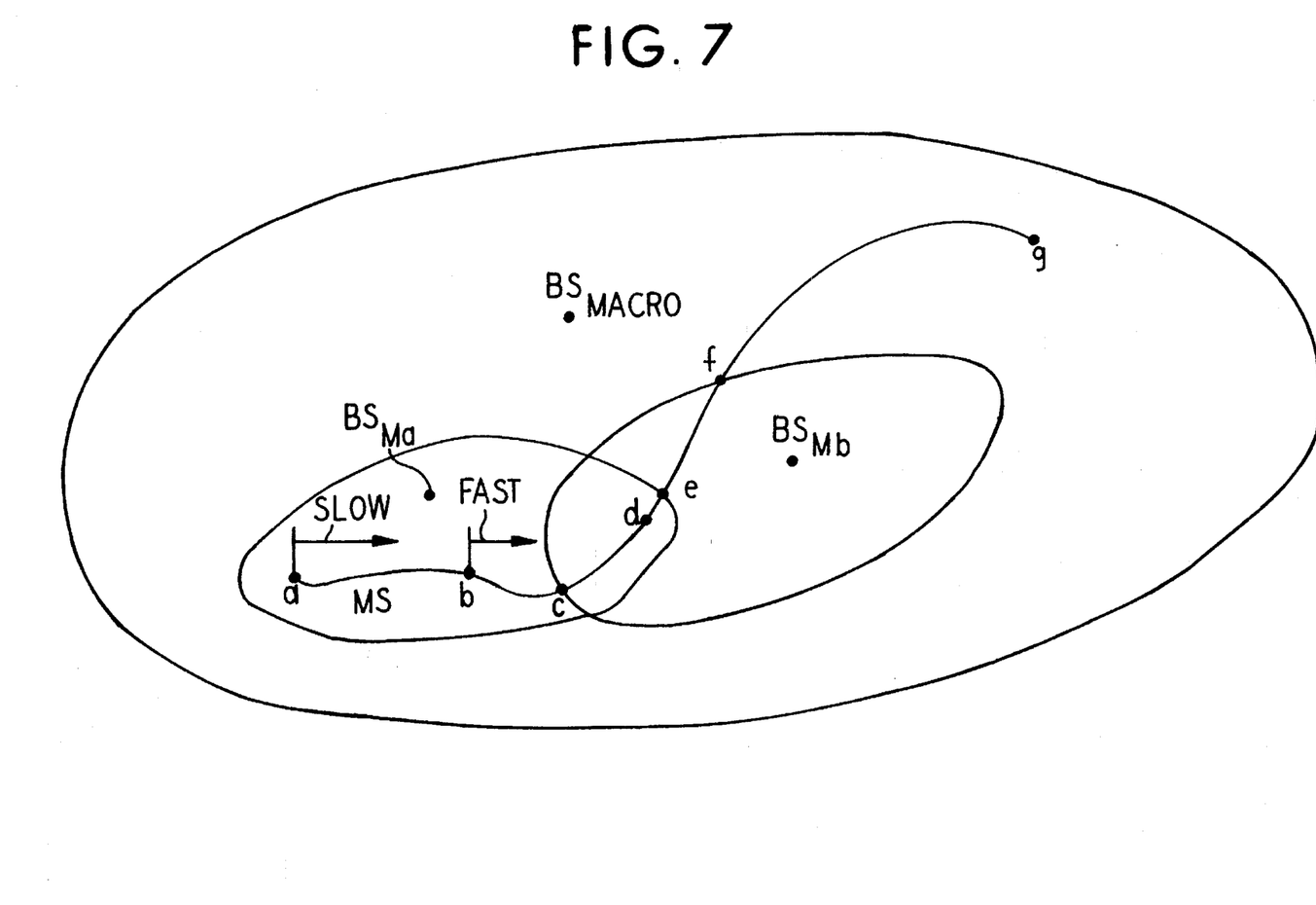

The method can also be applied when a mobile station is allocated to the base station of a micro cell of a hierarchic cell structure and travels toward an adjoining micro cell. When the mobile station moves slowly toward the adjoining micro cell, then a hand over into the adjoining micro cell is requested for the mobile station with this procedure; when, by contrast, it is moving rapidly, then a hand over into the macro cell lying thereabove is requested for it. Such a version is shown in FIG. 7, whereby the slow mobile station sets up a call in a micro cell and approaches an adjoining micro cell at high speed, travels into it and leaves the adjoining micro cell after a short time. In detail, this has the appearance that a slow mobile station MS at the point a within the left-hand micro cell having the base station $BS_{Ma}$ is allocated to this micro cell and sets up a call. The mobile station MS speeds up in the region of point b. The mobile station MS which has become a fast mobile station MS in the meantime, reaches the coverage domain of the adjoining micro cell having the base station $BS_{Mb}$ at point c, whereupon the timer $T_{HO}$ is started in the hand over decision process. The timer $T_{HO}$ has not yet run down when point d is reached—shortly before leaving the original micro cell having the base station $BS_{Ma}$. It is found in the hand over decision process that the radio coverage of the mobile station MS by the adjoining micro cell having the base station $BS_{Mb}$ has significantly improved. Consequently, the adjoining micro cell having the base station $BS_{Mb}$ is blocked by the hand over decision process for incoming hand over for the appertaining mobile station. The mobile station leaves the original radio coverage domain of the micro cell having the base station $BS_{Mb}$ at point e. On the basis of the entering measured data from mobile station and/or base station $BS_{Ma}$, the hand over decision process finds that the connection between mobile station MS and base station $BS_{Ma}$ of the left-hand micro cell has become too poor in quality or the level is too low or the distance has become too great and therefore requests a hand over into the macro cell lying thereabove on the basis of static decisions, since the micro cell having the base station $BS_{Mb}$ is blocked for incoming hand over for the appertaining mobile station. The fast mobile station MS leaves the radio coverage domain of the micro cell having the base station $BS_{Mb}$ at point f. The block is canceled and the timer $T_{HO}$ is reset. The mobile station MS ends the call in the macro cell (point g) and proceeds into the idle mode.

A monitoring timer TR can be introduced between the resetting of the timer and the re-starting of the timer $T_{HO}$ for one and the same call. The monitoring timer TR is started when the timer is reset and the timer can only be started again after the run-down of the monitoring timer in case the mobile station is located in the radio coverage domain of a cell. Timer $T_{HO}$ and monitoring timer TR can also be implemented as counters. The timer $T_{HO}$ is administered per call or is also administered per call and neighboring cell. Since, namely, a plurality of micro cells can adjoin one micro cell, all neighboring cells are thus co-involved in the hand over decision process. Further, a threshold is administered per neighboring cell, this threshold serving the purpose in the hand over decision process of determining whether the radio coverage has significantly or insignificantly improved. An additional monitoring timer TR is administered per call or per call and neighboring cell. Further, the various possibilities are established that timer and monitoring timer monitor both the uplink as well as the downlink in duplex systems or also monitor only the downlink or only the uplink. The starting values of the timer and of the monitoring timer in the uplink and downlink can be identical or can also be different. Further, they can be occupied with starting values by a remote unit (for example, operation and maintenance center).

The functional behavior of the hand over decision process shall be set forth with reference to FIGS. 8 and 9 for fast and slow mobile stations.

Figure 8:
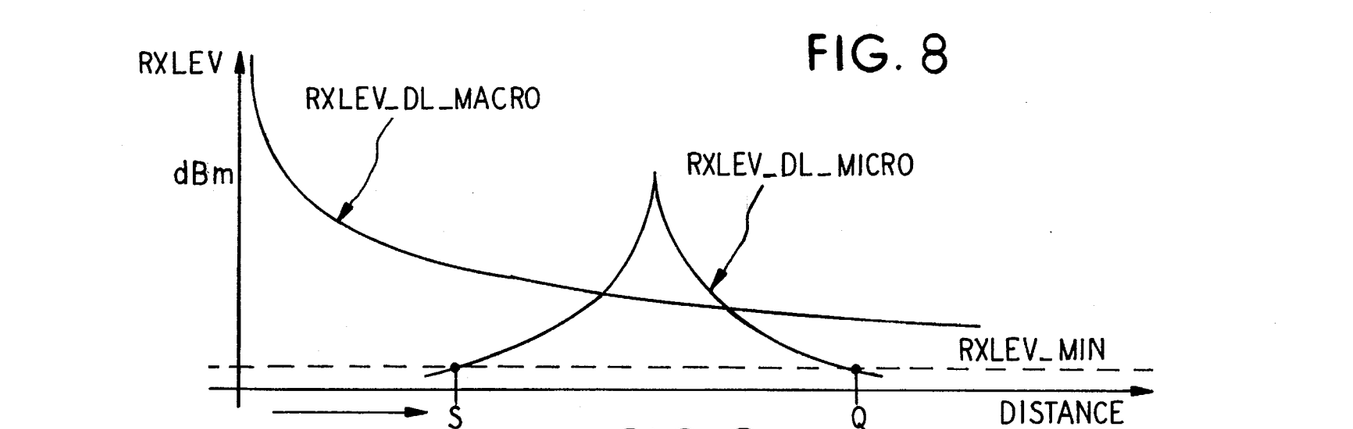
FIGS. 8 and 9 depict functional behavior of the hand over decision process of the present invention.

FIG. 8 outlines the received level of a mobile station as function of the distance from the base station of a macro cell and from that of a micro cell contained in the macro cell. RXLEV DL MACRO thereby means the received level of the mobile station from the macro cell and RXLEV DL MICRO denotes that of the micro cell. Further, the minimum received level that a mobile station must receive from a base station in order to set up a connection to the appertaining base station is entered in FIG. 8.

Figure 9:
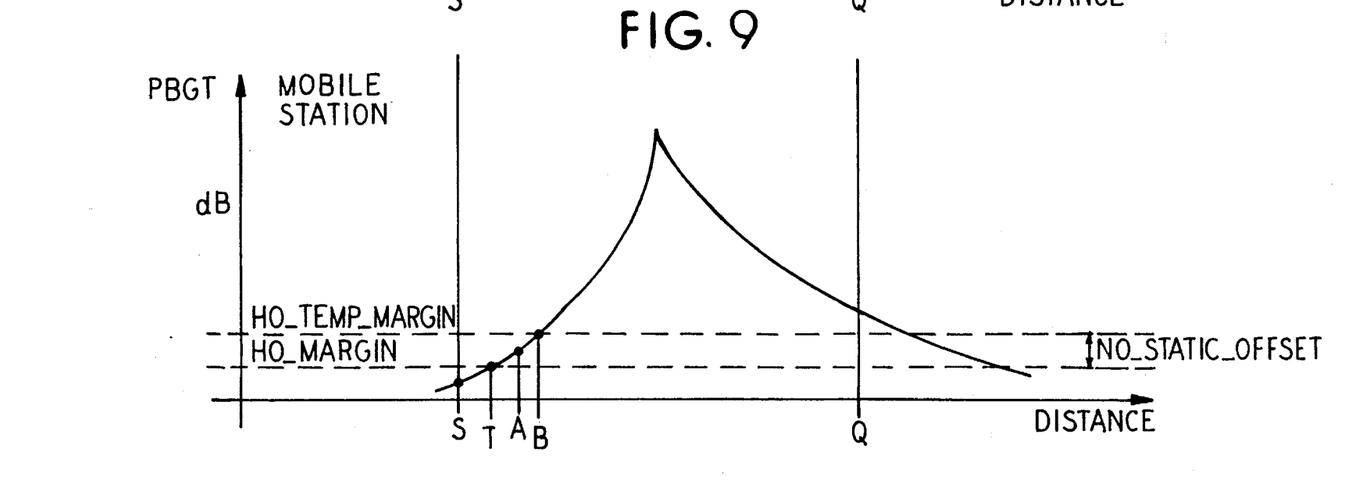

FIG. 9 shows the curve of a quantity calculated from the received levels RXLEV DL MACRO, RXLEV DL MICRO and further variables. This quantity is referred to as power budget (PBGT) and indicates the relative level to the neighboring cell (here, the micro cell). When the PBGT is greater than zero or, respectively, above a threshold, then the radio coverage by the neighboring cell (micro cell) is better than that of the allocated base station. The cell boundary of a cell can be indicated by the quantity PBGT.

The PBGT can be calculated as follows:

$$PBGT=MIN(MS\ MACRO,P)-RXLEV\ DL\ MACRO-(MIN(MS\ MICRO<P)-RXLEV\ DL\ MICRO)$$

P thereby denotes the maximally possible transmission power of the MS, MS MACRO or, respectively, MS MICRO denotes the maximally allowed transmission power of the mobile station in the macro cell or, respectively, micro cell, RXLEV DL MACRO and RXLEV DL MICRO denote the received levels of the macro cell and micro cell.

Further, the thresholds HO TEMP MARGIN and HO MARGIN are entered in FIG. 9. These thresholds are used for comparing the derived quantity PBGT in order to characterize specific conditions of the mobile station. The cell boundary is defined with HO MARGIN and with the threshold RXLEV MIN. HO TEMP MARGIN is an indicator as to whether the radio coverage of the mobile station by the neighboring cell has significantly or insignificantly improved.

When the conditional equations $$RXLEV\ DL\ MICRO > RXLEV\ MIN \qquad (1)$$

$$PBGT > HO\ MARGIN \qquad (2)$$

are satisfied, then the mobile station has crossed the cell boundary to the micro cell and the timer $T_{HO}$ is started with the starting value $T_O$. When at least one of the two conditions is not satisfied, then the timer $T_{HO}$ is stopped and reset.

While the timer $T_{HO}$ is running, the power budget is compared to the threshold $$HO\ TEMP\ MARGIN = HO\ MARGIN + HO\ STATIC\ OFFSET$$

When it is found before the run-down of the timer $T_{HO}$ that $$PBGT \geq HO\ TEMP\ MARGIN,$$

then the neighboring micro cell is blocked for the appertaining mobile station, since the upper transgression of a certain threshold within a time interval indicates a fast mobile station.

When, by contrast, it is found upon run-down of the timer $T_{HO}$ that $$PBGT < HO\ TEMP\ MARGIN$$

then a hand over into the neighboring micro cell is requested. It was found in this case that the improvement of the radio coverage of the mobile station by the micro cell improved only insignificantly during the time interval.

A mobile station moves toward the micro cell. After the mobile station has reached the cell boundary of the micro cell (point T in FIG. 9), the timer $T_{HO}$ is started with the starting value $T_O$. During the running of the timer $T_{HO}$, a query is made in the hand over decision process as to whether the radio coverage of the mobile station by the micro cell has significantly or insignificantly improved. The timer $T_{HO}$ runs down at point A and the hand over decision process finds that the condition for an insignificant improvement of the radio coverage for the mobile station within the time interval $T_O$ by the micro cell has been satisfied, namely

PBGT<HO TEMP MARGIN

The hand over decision process thereupon requests a hand over for the mobile station into the micro cell.

When, by contrast, the mobile station reaches point B before run-down of the timer $T_{HO}$, the relationship

PBGT≧HO TEMP MARGIN is valid, then the micro cell is blocked for the appertaining mobile station. The block is canceled and the timer $T_{HO}$ is reset when the cell boundary is crossed again (point Q or point T).

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A mobile speed dependent handover decision method for use in a mobile radio network having a plurality of base stations arranged in a hierarchical cell structure, which is composed of macro cells in an upper layer of the hierarchical cell structure and micro cells in a lower layer of the hierarchical cell structure, a mobile station allocated to a base station of a serving macro cell and moving through a coverage area of micro cells, said handover decision method controlled by the speed of said mobile station, comprising the steps of:

performing uplink measurements of a signal level of said mobile station by the base station of said serving macro cell, and performing downlink measurements of signal levels of said serving macro cell and said micro cells by said mobile station;

calculating relative signal levels based on said uplink and downlink measurements for each of said micro cells;

starting a separate timer for each micro cell when it has been determined that the mobile station has entered the radio coverage domain of a respective micro cell;

comparing said measured signal levels and said calculated relative signal levels to predetermined thresholds for each micro cell while a respective timer thereof is running;

based on above said measurements, continuously calculating and comparing radio coverage improvement in each micro cell with a predetermined threshold associated with each micro cell;

requesting and performing a handover for said mobile station from said serving macro cell into a micro cell when an associated timer thereof exceeds a predetermined time interval threshold for that micro cell before the radio coverage improvement reached said associated predetermined threshold as an indicator of slow movement of said mobile station; and preventing a handover for said mobile station from said serving macro cell into a micro cell when its associated timer has not yet reached said associated predetermined time interval threshold but its radio coverage improvement thereof has already exceeded said associated prescribed threshold as an indicator of fast movement of said mobile station.

2. The method according to claim 1, wherein the prevention for incoming hand over into the micro cell is canceled for the appertaining mobile station and the timer is reset when the hand over decision process has found that the mobile station has left the radio coverage domain of the micro cell.

3. The method according to claim 2, wherein the timer is started again when it is recognized in the hand over decision process that the mobile station is again located in the radio coverage domain of a micro cell.

4. The method according to claim 1, wherein the steps of the method are executed when the mobile station is allocated to the base station of a micro cell of a hierarchic cell structure and approaches an adjoining micro cell.

5. The method according to claim 4, wherein the timer is stopped and reset after a successful hand over.

6. The method according to claim 5, wherein a hand over into the adjoining micro cell is requested for the mobile station given slow travel of the mobile station toward an adjoining micro cell and a hand over into the macro cell lying thereabove is requested given fast travel.

7. The method according to claim 1, wherein the time interval to be monitored is greater than or equal to a measurement period for the evaluation of data received in the hand over decision process.

8. The method according to claim 1, wherein a monitoring timer is provided between the resetting of the timer and the re-starting of the timer for one and the same call, this monitoring timer being started when the timer is reset and effecting that the timer can only be started again after the run-down of the monitoring timer in case the mobile station is located in the radio coverage domain of a micro cell.

9. The method according to claim 8, wherein at least one of the timer and monitoring timer are implemented as counters.

10. The method according to claim 1, wherein at least one of the timer and monitoring timer is administered per call and per neighboring cell.

11. The method according to claim 1, wherein a threshold that determines whether the radio coverage has significantly or insignificantly improved is administered per neighboring cell.

12. The method according to claim 1, wherein a respective time interval to be set forms a criterion for improvement of anticipated radio coverage of the mobile station in the micro cell in accord with a vehicle speed of the mobile radio telephone subscriber.

13. A mobile speed dependent handover decision method for use in a mobile radio network having a plurality of base station arranged in a hierarchical cell structure, composed of macro cells in an upper layer and micro cells in a lower layer, a mobile station allocated to a base station of a serving macro cell and moving through a coverage area of micro cells, comprising the steps of:

performing uplink measurements of a signal level of said mobile station by the base station of said serving macro cell, and performing downlink measurements of the signal levels of said serving macro cell and said micro cells by said mobile station;

calculating relative signal levels based on said uplink and downlink measurements for each of said micro cells;

starting a separate timer for each micro cell when it has been determined that the mobile station has entered the radio coverage domain of a respective micro cell;

comparing said measured signal levels and said calculated relative signal levels to predetermined thresholds for each micro cell while a respective timer thereof is running;

based on above said measurements, continuously calculating and comparing radio coverage improvement in each micro cell with a predetermined threshold associated with each micro cell;

requesting and performing a handover for said mobile station from said serving macro cell into a micro cell when an associated timer thereof exceeds a predetermined time interval threshold for that micro cell before the radio coverage improvement reached said associated predetermined threshold as an indicator of slow movement of said mobile station;

preventing a handover for said mobile station from said serving macro cell into a micro cell when its associated timer has not yet reached said associated predetermined time interval threshold but its radio coverage improvement thereof has already exceeded said associated prescribed threshold as an indicator of fast movement of said mobile station;

cancelling the prevention for handover into the micro cell for the appertaining mobile station and resetting the timer when the handover decision process has found that the mobile station has left the radio coverage domain of the micro cell; and starting again the timer when it is recognized in the handover decision process that the mobile station is again located in a radio coverage domain of that micro cell.

14. The method according to claim 13, wherein the steps of the method are executed when the mobile station is allocated to the base station of a micro cell of a hierarchic cell structure and approaches an adjoining micro cell.

15. The method according to claim 14, wherein the timer is stopped and reset after a successful hand over.

16. The method according to claim 15, wherein a hand over into the adjoining micro cell is requested for the mobile station given slow travel of the mobile station toward an adjoining micro cell and a hand over into the macro cell lying thereabove is requested given fast travel.

17. The method according to claim 13, wherein the time interval to be monitored is greater than or equal to a measurement period for the evaluation of data received in the hand over decision process.

18. The method according to claim 13, wherein a threshold that determines whether the radio coverage has significantly or insignificantly improved is administered per neighboring cell.

19. The method according to claim 13, wherein a respective time interval to be set forms a criterion for improvement of anticipated radio coverage of the mobile station in the micro cell in accord with a vehicle speed of the mobile radio telephone subscriber.

20. A mobile speed dependent handover decision method for use in a mobile radio network having a plurality of base stations arranged in a hierarchical cell structure, which is composed of macro cells in an upper layer and micro cells in a lower layer of the hierarchical cell structure, a mobile station allocated to a base station of a serving macro cell and moving through a coverage area of micro cells, said handover decision method controlled by the speed of said mobile station, comprising the steps of:

performing uplink measurements of a signal level of said mobile station by the base station of said serving macro cell, and performing downlink measurements of signal levels of said serving macro cell and said micro cells by said mobile station;

calculating relative signal levels based on said uplink and downlink measurements for each of said micro cells;

starting a separate timer for each micro cell when it has been determined that the mobile station has entered the radio coverage domain of a respective micro cell;

comparing said measured signal levels and said calculated relative signal levels to predetermined thresholds for each micro cell while a respective timer thereof is running;

based on above said measurements, continuously calculating and comparing radio coverage improvement in each micro cell with a predetermined threshold associated with each micro cell;

requesting and performing a handover for said mobile station from said serving macro cell into a micro cell when an associated timer thereof exceeds a predetermined time interval threshold for that micro cell before the radio coverage improvement reached said associated predetermined threshold as an indicator of slow movement of said mobile station;

preventing a handover for said mobile station from said serving macro cell into a micro cell when its associated timer has not yet reached said associated predetermined time interval threshold but its radio coverage improvement thereof has already exceeded said associated prescribed threshold as an indicator of fast movement of said mobile station; and providing a monitoring timer between the resetting of the timer and the restarting of the timer for one and the same cell, this monitoring timer being started when the timer is reset and effecting that the timer can only be started again after the run-down of the monitoring timer in case the mobile station is located in a radio coverage domain of a micro cell.

21. A mobile speed dependent handover decision method for use in a mobile radio network having a plurality of base stations arranged in a hierarchical cell structure, composed of macro cells in an upper layer of the hierarchical cell structure and micro cells in the lower layer, said method of handover decision depending on the speed of a mobile station for a radio telephone subscriber allocated to the base station of a macro cell and moving through a coverage area of said micro cells, said speed dependent handover decision method comprising the steps of:

performing uplink measurements of a signal level of said mobile station by the base station of said macro cell, and performing downlink measurements of signal levels of said macro cell and said micro cells by said mobile station;

calculating relative signal levels for said micro cells based on said uplink and downlink measurements;

comparing said measured signal levels and said calculated relative signal levels of said micro cells to thresholds, to determine if the mobile station has entered the radio coverage domain of said one or more micro cells;

starting a separate timer for each micro cell, when it has been determined that the mobile station has entered the radio coverage domain of a respective micro cell;

continuously comparing the timer interval associated with each micro cell with an arbitrary but anticipated time interval related to each micro cell in accordance with the speed of said mobile station;

while said timers are running, continuously calculating radio coverage improvement of said mobile station in each micro cell, and comparing said radio coverage improvement with a prescribed threshold associated with each micro cell;

requesting and performing a handover for said mobile station from said macro cell into that micro cell when its associated timer exceeds said time interval for that micro cell, before the associated radio coverage improvement reached said prescribed threshold as an indicator of slow movement of said mobile station; and preventing a handover for said mobile station from said macro cell into a micro cell when its associated timer has not yet exceeded said time interval but the radio coverage improvement of this micro cell exceeds said prescribed threshold as an indicator of rapid motion of said mobile station.

22. A mobile speed dependent handover decision method for use in a mobile radio network having a plurality of base stations arranged in a hierarchical cell structure, composed of macro cells in an upper layer of the hierarchical cell structure and micro cells in a lower layer of the hierarchical cell structure, said method of handover decision depending on the speed of a mobile station for a radio telephone subscriber allocated to the base station of a macro cell and moving through a coverage area of said micro cells, said speed dependent handover decision method comprising the steps of:

performing uplink measurements of a signal level of said mobile station by the base station of said macro cell, and performing downlink measurements of signal levels of said macro cell and said micro cells by said mobile station;

calculating relative signal levels for said micro cells based on said uplink and downlink measurements;

comparing said measured signal levels and said calculated relative signal levels of said micro cells to thresholds, to determine if the mobile station has entered the radio coverage domain of said one or more micro cells;

starting a separate timer for each micro cell, when it has been determined that the mobile station has entered the radio coverage domain of a respective micro cell;

continuously comparing the timer interval associated with each micro cell with an arbitrary but anticipated time interval related to each micro cell in accordance with the speed of said mobile station;

while said timers are running, continuously calculating radio coverage improvement of said mobile station in each micro cell, and comparing said radio coverage improvement with a prescribed threshold associated with each micro cell;

requesting and performing a handover for said mobile station from said macro cell into that micro cell when its associated timer exceeds said time interval for that micro cell before the associated radio coverage improvement reached said prescribed threshold as an indicator of slow movement of said mobile station;

preventing a handover for said mobile station from said macro cell into the micro cell when its associated timer has not yet exceeded said time interval but the radio coverage improvement of this micro cell exceeds said prescribed threshold as an indicator of rapid motion of said mobile station; and performing incoming handover into the micro cell for the mobile station and resetting the timer associated with the micro cell when it is found that said mobile station has left the coverage domain of that micro cell, and restarting the timer again when it is found that said mobile station is again located in the coverage domain of that micro cell.

23. A mobile speed dependent handover decision method for use in a mobile radio network having a plurality of base stations arranged in a hierarchical cell structure, composed of macro cells in an upper layer of the hierarchical cell structure and micro cells in a lower layer of the hierarchical cell structure, said method of handover decision depending on the speed of a mobile station for a radio telephone subscriber allocated to the base station of a macro cell and moving through the coverage area of said micro cells, said speed dependent handover decision method comprising the steps of:

performing uplink measurements of a signal level of said mobile station by the base station of said macro cell, and performing downlink measurements of signal levels of said macro cell and said micro cells by said mobile station;

calculating relative signal levels for said micro cells based on said uplink and downlink measurements;

comparing said measured signal levels and said calculated relative signal levels of said micro cells to thresholds, to determine if the mobile station has entered the radio coverage domain of said one or more micro cells;

starting a separate timer for each micro cell, when it has been determined that the mobile station has entered the radio coverage domain of a respective micro cell;

continuously comparing the timer interval associated with each micro cell with an arbitrary but anticipated time interval related to each micro cell in accordance with the speed of said mobile station;

while said timers are running, continuously calculating radio coverage improvement of said mobile station in each micro cell, and comparing said radio coverage improvement with a prescribed threshold associated with each micro cell;

requesting and performing a handover for said mobile station from said macro cell into that micro cell when its associated timer exceeds said time interval before the associated radio coverage improvement reached said prescribed threshold as an indicator of slow movement of said mobile station;

preventing a handover for said mobile station from said macro cell into a micro cell when its associated timer has not yet exceeded said time interval but the radio coverage improvement of this micro cell exceeds said prescribed threshold as an indicator of rapid motion of said mobile station; and providing for each timer a monitoring timer between the resetting of the timer and the re-starting of the timer for one and the same call, this monitoring timer being started when the corresponding timer is reset and effecting that the corresponding timer may only be started again after the run-down of said monitoring timer in case the mobile station is located in a radio coverage domain of a micro cell.

* * * * *